(12) United States Patent
Saravanaperumal et al.

(10) Patent No.: US 11,637,821 B2
(45) Date of Patent: Apr. 25, 2023

(54) SYSTEM AND METHOD FOR CERTIFICATE BASED AUTHENTICATION FOR TETHERING

(71) Applicant: Samsung Electronics Co., Ltd., Suwon-si (KR)

(72) Inventors: Vignesh Saravanaperumal, San Jose, CA (US); Praveen Moongalam Thyagarajan, San Jose, CA (US); Sanjay A. Patil, Milpitas, CA (US); Stephen Elliot McLaughlin, San Jose, CA (US); Bulent Kasman, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 17/302,742

(22) Filed: May 11, 2021

(65) Prior Publication Data

US 2021/0352062 A1 Nov. 11, 2021

Related U.S. Application Data

(60) Provisional application No. 63/023,008, filed on May 11, 2020.

(51) Int. Cl.
| | |
|---|---|
| *G06F 21/44* | (2013.01) |
| *G06F 21/33* | (2013.01) |
| *H04L 9/40* | (2022.01) |
| *H04L 61/4511* | (2022.01) |
| *G06F 21/31* | (2013.01) |

(52) U.S. Cl.
CPC ...... *H04L 63/0823* (2013.01); *H04L 61/4511* (2022.05); *H04L 63/0236* (2013.01); *H04L 63/0272* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 10,321,316 B1 | 6/2019 | Belton, Jr. et al. | |
| 10,454,929 B2 | 10/2019 | Spencer et al. | |
| 10,511,967 B2 * | 12/2019 | Kang | H04L 63/205 |
| 10,616,205 B2 * | 4/2020 | Abbondanzio | H04L 63/0823 |

(Continued)

OTHER PUBLICATIONS

Secure MAC-Layer Protocol for Captive Portals in Wireless Hotspots. Choi. IEEE. (Year: 2011).*

(Continued)

*Primary Examiner* — Venkat Perungavoor

(57) ABSTRACT

A method includes enabling, by a tethering device that is tethered to a tethered device, a firewall to redirect network traffic from the tethered device to an authentication application executing on the tethering device. The method also includes receiving, by the tethering device from the tethered device, a user certificate of the tethered device during an authentication process. The method further includes verifying, by the tethering device, the user certificate of the tethered device using a certificate authority (CA) certificate of the tethered device that is installed on the tethering device. In addition, the method includes, in response to successful verification of the user certificate of the tethered device, disabling the firewall to allow the network traffic to and from the tethered device.

20 Claims, 8 Drawing Sheets

(56) References Cited

U.S. PATENT DOCUMENTS

| | | | |
|---|---|---|---|
| 10,904,758 B2 | 1/2021 | Bhatt et al. | |
| 2004/0064693 A1* | 4/2004 | Pabla | G06Q 30/02 |
| | | | 713/168 |
| 2005/0216747 A1* | 9/2005 | Yeap | H04W 12/06 |
| | | | 713/185 |
| 2006/0242405 A1* | 10/2006 | Gupta | H04L 9/321 |
| | | | 713/156 |
| 2012/0124641 A1 | 5/2012 | Hegge et al. | |
| 2012/0290614 A1 | 11/2012 | Nandakumar et al. | |
| 2013/0311779 A1* | 11/2013 | Sherkin | H04L 9/321 |
| | | | 713/175 |
| 2015/0095999 A1* | 4/2015 | Toth | H04L 9/3263 |
| | | | 726/6 |
| 2018/0241775 A1 | 8/2018 | Vera-Schockner | |
| 2019/0149538 A1* | 5/2019 | Friel | H04L 63/0823 |
| | | | 726/6 |
| 2020/0304474 A1 | 9/2020 | Kisko | |

OTHER PUBLICATIONS

Enterprise Wireless Fidelity Implementations Using Port Based Network Access Control (IEEE 802.1X) . Ameen. IJCST. (Year: 2012).*

Certificate sharing system for secure certificate distribution in mobile environment. Kim. Elsevier. (Year: 2016).*

Implementation of Wireless VoIP System based on VPN. Park. (Year: 2008).*

International Search Report and Written Opinion of the International Searching Authority in connection with International Application No. PCT/KR2021/005909 dated Aug. 24, 2021, 7 pages.

Huang et al., "Analyzing Forged SSL Certificates in the Wild", 2014 IEEE Symposium on Security and Privacy, Nov. 20, 2014, 15 pages.

* cited by examiner

SYSTEM AND METHOD FOR CERTIFICATE BASED AUTHENTICATION FOR TETHERING

CROSS-REFERENCE TO RELATED APPLICATION AND PRIORITY CLAIM

This application claims priority under 35 U.S.C. § 119(e) to U.S. Provisional Patent Application No. 63/023,008 filed on May 11, 2020, which is hereby incorporated by reference in its entirety.

TECHNICAL FIELD

This disclosure relates generally to communication between electronic devices. More specifically, this disclosure relates to a system and method for certificate based authentication for tethering.

BACKGROUND

Mobile phones have become integral tools for employees or personnel in corporate or enterprise environments. Enterprise mobile phones can be used to fetch enterprise data such as emails, messages, etc. using a secured channel, such as a virtual private network (VPN). In situations where WiFi communication is not secured or not available (e.g., during corporate travel), personnel can tether their laptop or other computing device to their enterprise mobile phone to access enterprise data. In most cases, the laptop must be authenticated before it is permitted to access corporate data for security.

SUMMARY

This disclosure provides a system and method for certificate based authentication for tethering.

In a first embodiment, a method includes enabling, by a tethering device that is tethered to a tethered device, a firewall to redirect network traffic from the tethered device to an authentication application executing on the tethering device. The method also includes receiving, by the tethering device from the tethered device, a user certificate of the tethered device during an authentication process. The method further includes verifying, by the tethering device, the user certificate of the tethered device using a certificate authority (CA) certificate of the tethered device that is installed on the tethering device. In addition, the method includes, in response to successful verification of the user certificate of the tethered device, disabling the firewall to allow the network traffic to and from the tethered device.

In a second embodiment, an electronic device includes at least one memory configured to store instructions. The electronic device also includes a processor configured when executing the instructions to enable a firewall to redirect network traffic from a tethered device to an authentication application executing on the electronic device, wherein the tethered device is tethered to the electronic device; receive a user certificate of the tethered device from the tethered device during an authentication process; verify the user certificate of the tethered device using a CA certificate of the tethered device that is installed on the electronic device; and in response to successful verification of the user certificate of the tethered device, disable the firewall to allow the network traffic to and from the tethered device.

In a third embodiment, a non-transitory computer readable medium contains computer readable program code that, when executed, causes at least one processor of an electronic device to enable a firewall to redirect network traffic from a tethered device to an authentication application executing on the electronic device, wherein the tethered device is tethered to the electronic device; receive a user certificate of the tethered device from the tethered device during an authentication process; verify the user certificate of the tethered device using a certificate authority (CA) certificate of the tethered device that is installed on the electronic device; and in response to successful verification of the user certificate of the tethered device, disable the firewall to allow the network traffic to and from the tethered device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smart phone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures discussed below and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

In an enterprise system, such as a corporate computer network, it is common for devices to communicate through a VPN to minimize security risks. Such devices may need to be authenticated as authorized devices for communication via the VPN. In some systems, certificates can be used for authentication. As known in the art, a certificate is an electronic document that identifies an individual, a server, a corporate or enterprise entity, or some other entity. A certificate authority (CA) may be used to validate identities and issue certificates. The issued certificates can include user certificates and CA certificates.

Recently, tethering capabilities incorporated into many electronic devices (e.g., mobile devices, laptops, and the like) allow a tethered device to obtain access to a network (e.g., a corporate network, the internet, and the like) through a tethering device. Existing tethering solutions have allowed any tethered device to be connected to a tethering device and utilize a network or corporate VPN through the tethering device. This can be a security risk that allows unauthorized or vulnerable devices to send traffic through the VPN.

To address these and other issues, embodiments of this disclosure provide systems and methods for certificate based authentication for tethering. The disclosed embodiments allow only authorized tethered devices to send and receive network traffic through a tethering device with internet connectivity. The disclosed embodiments prevent unauthorized tethered devices from sending or receiving tethering traffic through corporate mobile devices or through an enterprise VPN established in a corporate mobile device. The disclosed embodiments also restrict the tethered devices that can establish a tethering connection with a tethering device. The disclosed embodiments provide these benefits without the development of custom protocols, custom applications, or operating system-level changes on the tethered device. Moreover, the disclosed embodiments eliminate the need for maintenance of these applications on different operating systems.

Figure 1:
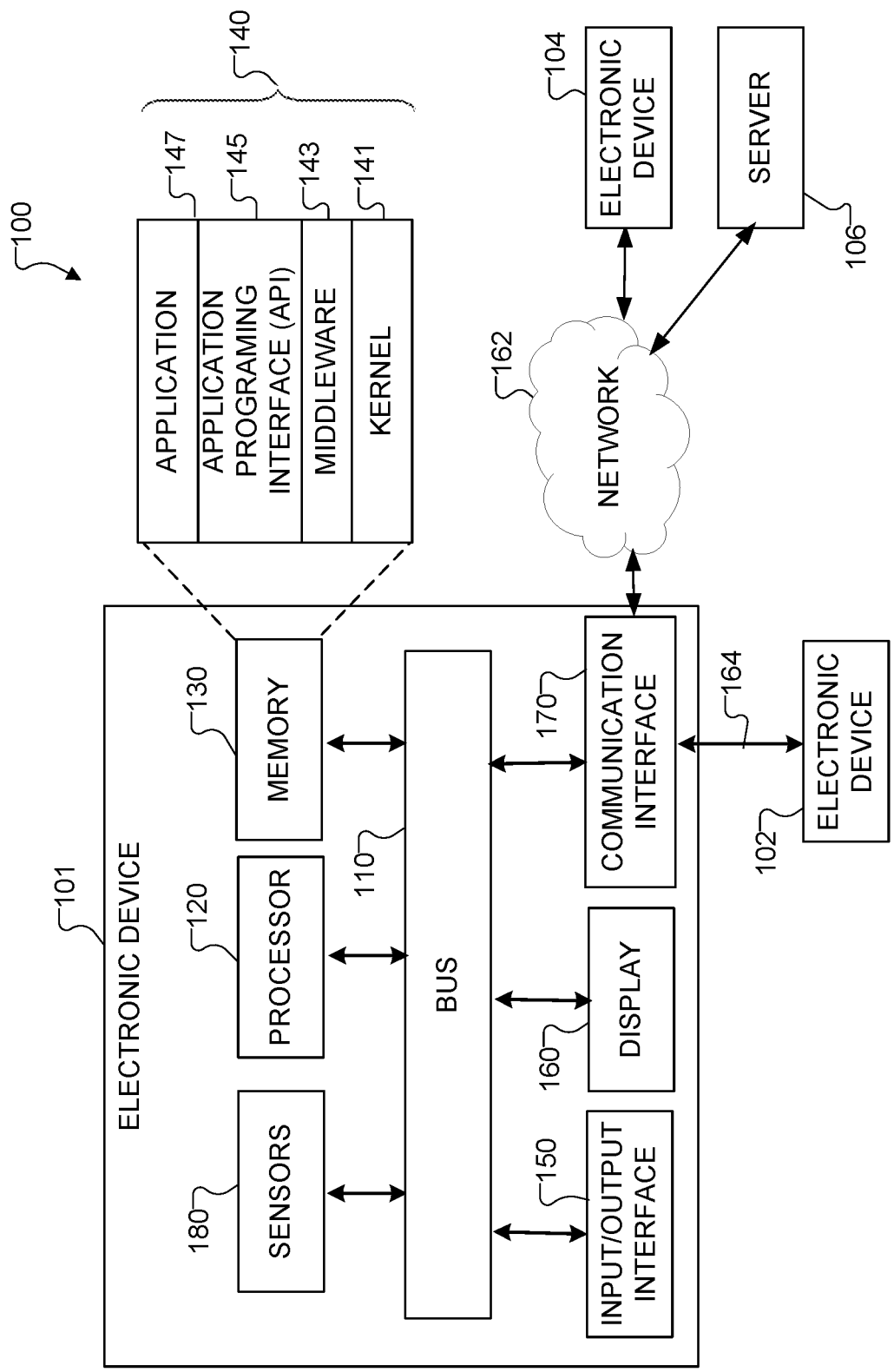
FIG. 1 illustrates an example network configuration in accordance with this disclosure.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or a sensor 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, an active matrix OLED (AMOLED), a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
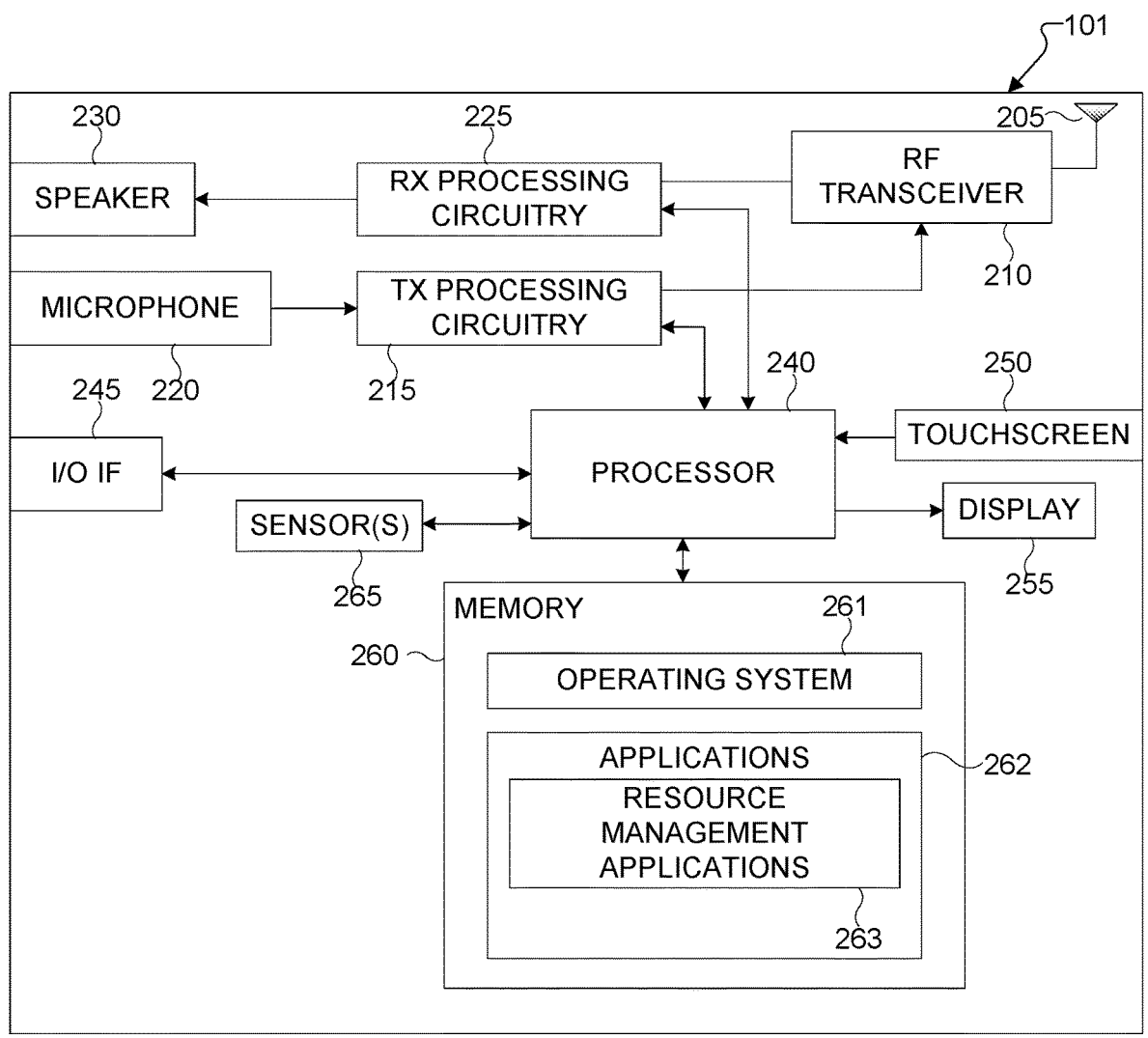
FIG. 2 illustrates an example electronic device in accordance with this disclosure.

FIG. 2 illustrates an example electronic device 101 in accordance with this disclosure. The electronic device 101 could represent one or more of the electronic devices 101, 102, or 104 in FIG. 1. As shown in FIG. 2, the electronic device 101 includes an antenna 205, a radio frequency (RF) transceiver 210, transmit (TX) processing circuitry 215, a microphone 220, and receive (RX) processing circuitry 225. The electronic device 101 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by another component in a system. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing.

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processors and execute the OS program 261 stored in the memory 260 in order to control the overall operation of the electronic device 101. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor 240 can execute a resource management application 263 for monitoring system resources. The processor 240 is also coupled to the I/O interface 245, which provides the electronic device 101 with the ability to connect to other devices such as laptop computers, handheld computers and other accessories, for example, a virtual reality (VR) headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the display 255. The operator of the electronic device 101 can use the input 250 (e.g., keypad, touchscreen, button etc.) to enter data into the electronic device 101. The display 255 may be an LCD, LED, OLED, AMOLED, MEMS, electronic paper, or other display capable of rendering text and/or at least limited graphics, such as from web sites.

The memory 260 is coupled to the processor 240. Part of the memory 260 could include a random access memory (RAM), and another part of the memory 260 could include a Flash memory or other read-only memory (ROM).

The electronic device 101 further includes one or more sensors 265 that can meter a physical quantity or detect an activation state of the electronic device 101 and convert metered or detected information into an electrical signal. For example, the sensor 265 may include any of the various sensors 180 discussed above.

Although FIG. 2 illustrates one example of an electronic device 101, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 101 configured as a mobile telephone or smart phone, electronic devices could be configured to operate as other types of mobile or stationary devices. In addition, as with computing and communication networks, electronic devices can come in a wide variety of configurations and FIG. 2 does not limit this disclosure to any particular electronic device.

Figure 3:
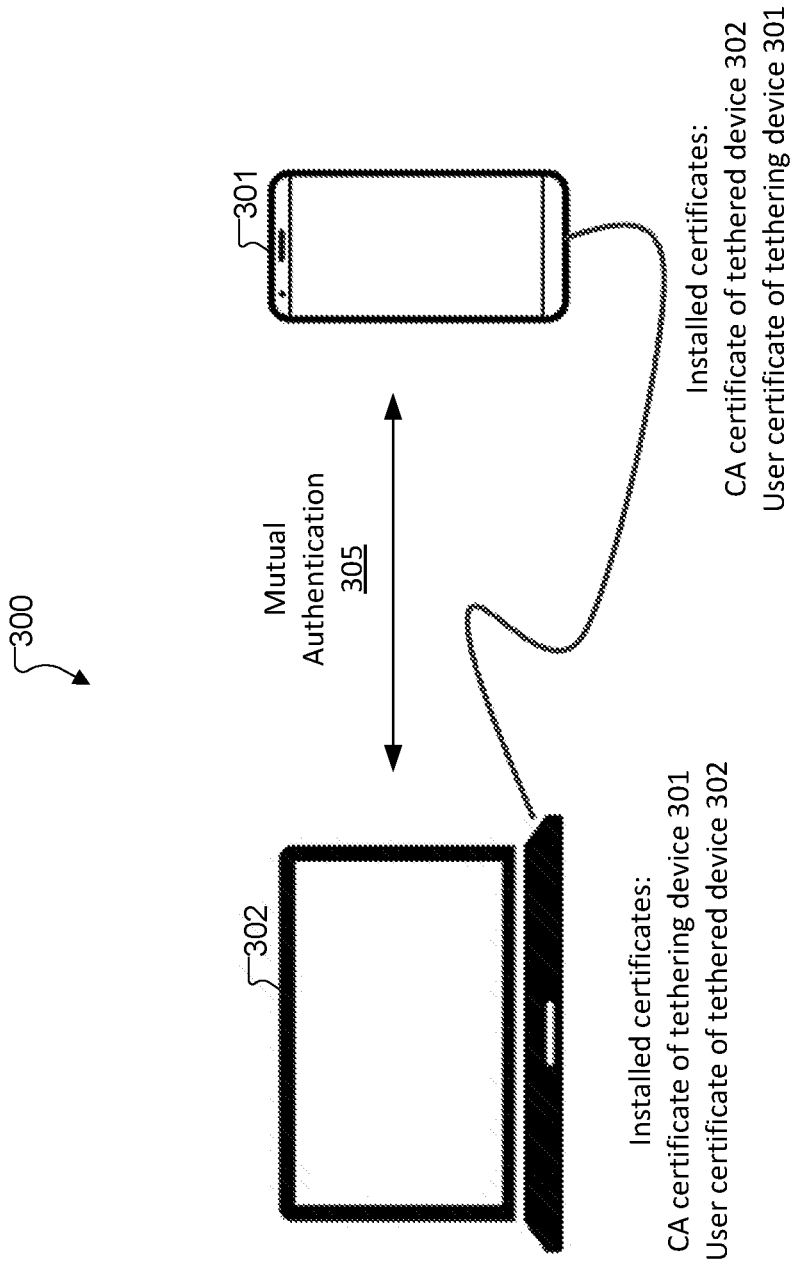
FIG. 3 illustrates an example system in which certificate based authentication for tethering can be used in accordance with this disclosure.

FIG. 3 illustrates an example system 300 in which certificate based authentication for tethering can be used in accordance with this disclosure. For ease of explanation, the system 300 is described as involving multiple electronic devices (such as the electronic device 101 of FIG. 1). However, the system 300 could be used with any other suitable device or system without departing from the scope of this disclosure.

As shown in FIG. 3, the system 300 comprises a tethering device 301 and a tethered device 302. Each of the devices 301-302 can represent (or be represented by) one of the electronic devices 101, 102, 104 of FIG. 1. As known in the art, the tethering device 301 provides a communication link between the tethered device 302 and one or more external networks, such as a corporate or enterprise VPN, the internet, or the like. In some embodiments, the tethering device 301 is an enterprise-configured mobile phone. That is, the tethering device 301 is a mobile phone that has been configured for use in an enterprise or corporate system or network. Such enterprise mobile phones are often provided to employees for work purposes. The enterprise can place restrictions on which tethered devices can send or receive data through the enterprise mobile phones for security and management purposes. In some embodiments, the tethered device 302 is a laptop, mobile phone, tablet, workstation, IoT device, or the like. Of course, these are merely examples; the devices 301-302 can represent any suitable electronic devices capable of tethering.

At the time that the tethered device 302 is connected to the tethering device 301, it may not be immediately known whether the tethered device 302 is authorized or unauthorized for data communication in the enterprise system. To determine the authorization status of the tethered device 302, the tethering device 301 and the tethered device 302 perform a mutual authentication process 305. In the mutual authentication process 305, the tethering device 301 performs an authentication process on the tethered device 302, and the tethered device 302 performs an authorization process on the tethering device 301. The mutual authentication process 305 uses certificates that are either pre-installed on the devices 301-302 or exchanged between the devices 301-302 during the mutual authentication process 305.

As shown in FIG. 3, each device 301-302 includes multiple certificates that are pre-installed in the device 301-302. For example, such installation may be performed by an enterprise IT personnel before delivery of each device 301-302 to its respective user. In particular, the tethering device 301 has a CA certificate of the tethered device 302 and a user certificate of the tethering device 301 pre-installed. Similarly, the tethered device 302 has a CA certificate of the tethering device 301 and a user certificate of the tethered device 302 pre-installed.

During the mutual authentication process 305, the tethering device 301 enables a firewall when the tethered device 302 is tethered to the tethering device 301. As known in the art, a firewall is a security application or algorithm that monitors and filters network traffic based on one or more security policies established by an enterprise. In the system 300, the tethering device 301 enables the firewall to prevent communication over an external network by the tethered device 302 through the tethering device 301. As shown in FIG. 3, the tethering connection between the devices 301-302 includes a physical wire or cable connecting the devices 301-302. However, in other embodiments, the tethering connection could be achieved via a wireless connection (e.g., via BLUETOOTH or another suitable wireless protocol).

Once the firewall is enabled, the tethering device 301 and the tethered device exchange certificates for mutual authentication. That is, the tethering device 301 sends the user certificate of the tethering device 301 to the tethered device 302. The tethered device 302 authenticates the user certificate of the tethering device 301 using the CA certificate of the tethering device 301, which is already installed on the tethered device 302. Likewise, the tethered device 302 sends the user certificate of the tethered device 302 to the tethering device 301. The tethering device 301 authenticates the user certificate of the tethered device 302 using the CA certificate of the tethered device 302, which is already installed on the tethering device 301.

Once the mutual authentication process 305 is complete, and the tethered device 302 is verified as an authorized device, the tethering device 301 disables the firewall so that the tethered device 302 can send and receive data traffic over the corporate VPN through the tethering device 301. Those of skill in the art will understand that this description of the mutual authentication process 305 is provided at a general level. Further details of the mutual authentication process 305 are provided below.

Although FIG. 3 illustrate example details of a system 300 in which certificate based authentication for tethering may be performed, various changes may be made to FIG. 3. For example, the system 300 could include any number of each component in any suitable arrangement. In general, computing and communication systems come in a wide variety of configurations, and FIG. 3 does not limit the scope of this disclosure to any particular configuration. Also, while the mutual authentication process 305 is described as a specific sequence of operations, various operations could overlap, occur in parallel, occur in a different order, or occur any number of times (including zero times).

Figure 4A:
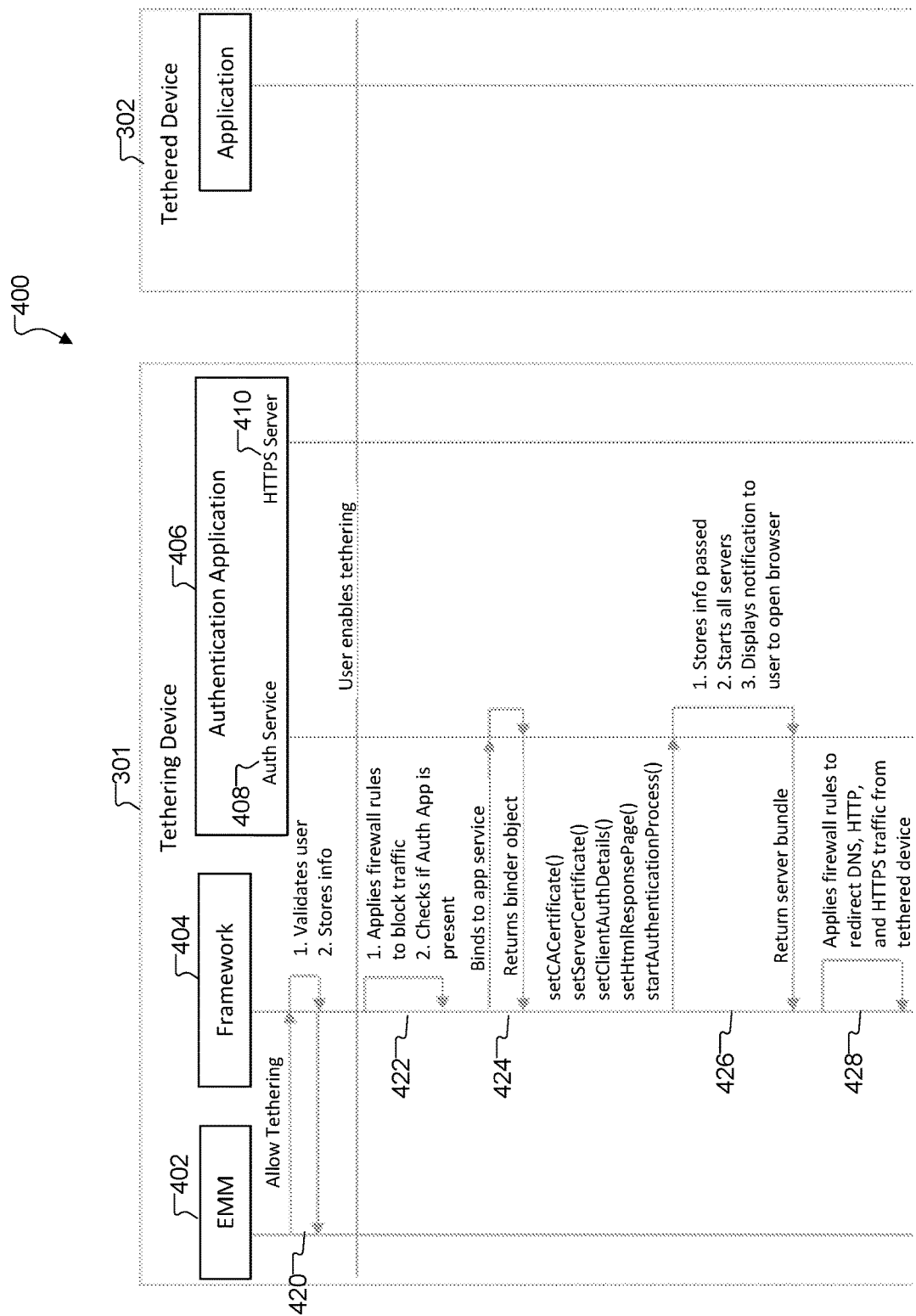
FIGS. 4A and 4B illustrate an example certificate based authentication process for tethering in accordance with this disclosure.
Figure 4B:
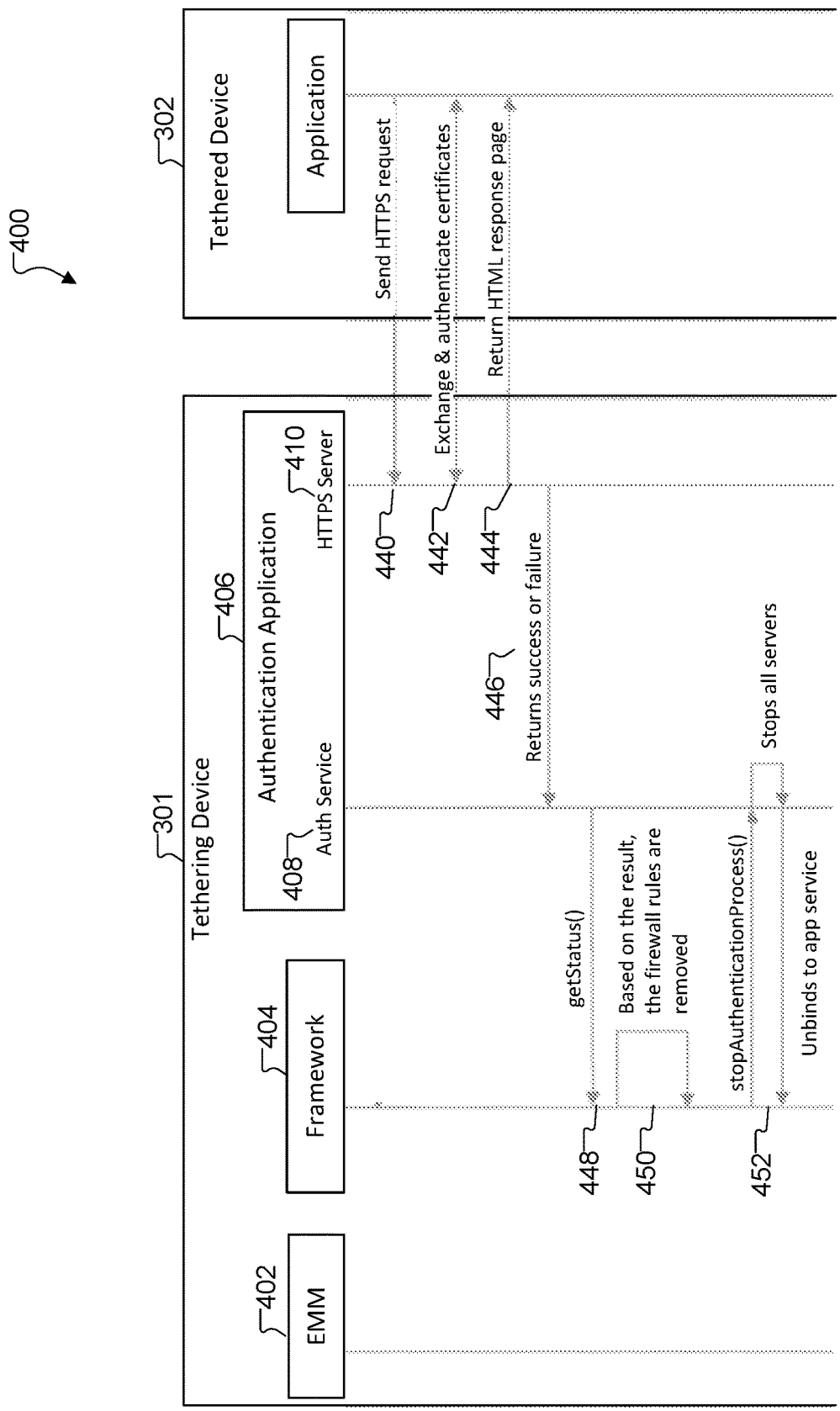

FIGS. 4A and 4B illustrate an example certificate based authentication process 400 for tethering in accordance with this disclosure. For ease of explanation, the process 400 is described as involving the tethering device 301 and the tethered device 302 of FIG. 3. In particular, the process 400 can include or represent the mutual authentication process 305 of FIG. 3. However, the process 400 could be used with any other suitable device or system and represent any suitable process without departing from the scope of this disclosure.

As shown in FIGS. 4A and 4B, the process 400 includes the tethering device 301 and the tethered device 302. The tethering device 301 includes multiple components installed therein, including an enterprise mobile management (EMM) module 402, a framework 404, and an authentication application 406.

The EMM module 402 is a local application agent executing on the tethering device 301. The framework 404 is a security framework that can be pre-installed on the tethering device 301. The framework 404 provides an enterprise organization with a toolset for managing enterprise devices, such as employee mobile phones or interactive kiosks. One example of the framework 404 is SAMSUNG KNOX by Samsung Electronics Co., Ltd., although the framework 404 can include any suitable framework. The authentication application 406 is a local application executing on the tethering device 302 for managing operations associated with the authentication process.

At the start of the process 400, the tethered device 302 is connected to the tethering device 301. For example, a user may have connected the tethered device 302 to the tethering device 301 and enabled tethering. Initially, the tethering device 301 may not know whether the tethered device 302 is an authorized device for VPN communication. Thus, the process 400 is performed to authenticate the tethered device 302.

As discussed previously, each device 301-302 is preconfigured with certificates for use in the process 400. For example, the tethering device 301 is configured with its user certificate along with the CA certificate for the tethered device 302. The tethered device 302 is configured with its user certificate along with the CA certificate of the tethering device 301. In some embodiments, the tethering device 301 has VPN capabilities enabled.

At operation 420, the EMM module 402 confirms the validity of tethering by validating the presence of the tethered device 302 and storing tethering information in a data storage (e.g., a database). In some embodiments, this is an optional step.

At operation 422, the tethering device 301 (and, in particular, the framework 404) detects that the tethering interface is active, and applies one or more firewall rules to block all network traffic from the tethered device 302. That is, the tethering device 301 applies the firewall rules to ensure that network traffic from the tethered device 302 is not sent over the VPN through the tethering device 301. In some embodiments executing a LINUX operation system, the firewall rules can be based on iptables. The framework 404 also determines if the authentication application 406 is present on the tethering device 301. If the authentication application 406 is present, then at operation 424, the framework 404 performs a bind process to launch the authentication application 406 in the background on the tethering device 301.

At operation 426, the framework 404 provides the preinstalled certificates at the tethering device 301 (e.g., the CA certificate of the tethering device 301 and the user certificate of the tethered device 302) to the authentication application 406, and the authentication application 406 stores the certificates. The authentication application 406 also initiates one or more local servers that will be used for the mutual authentication session between the tethering device 301 and the tethered device 302. As shown in FIGS. 4A and 4B, the local servers include an authentication service 408 and a HTTPS server 410. In some embodiments (such as described below in conjunction with FIGS. 5A and 5B), the local servers can also include a DNS server and a HTTP/HTTPS server.

At operation 428, the tethering device 301 applies firewall rules to redirect all network traffic from the tethered device 302 to the tethering device 301. In particular, HTTP/HTTPS traffic from the tethered device 302 is redirected to the HTTPS server 410 on the tethering device 301. The HTTPS server 410 sends an invalid certificate (i.e., a dummy certificate) to the tethered device 302 indicating that traffic is to be sent to a different address. The invalid certificate includes temporary HTTPS redirection with the address of the HTTPS server 410 with client authentication. Since the invalid certificate to the tethered device 302 has a HTTPS redirection, at operation 440, the tethered device 302 sends a HTTPS request to the HTTPS server 410 for authentication on the tethering device 301.

At operation 442, the tethering device 301 and the tethered device 302 perform a mutual authentication process. As a part of the operation 442, the tethering and tethered device exchange certificates. That is, the tethering device 301 sends the user certificate of the tethering device 301 to the tethered device 302. The tethered device 302 authenticates the user certificate of the tethering device 301 using the CA certificate of the tethering device 301, which is already installed on the tethered device 302. Likewise, the tethered device 302 sends the user certificate of the tethered device 302 to the tethering device 301. The tethering device 301 authenticates the user certificate of the tethered device 302 using the CA certificate of the tethered device 302, which is already installed on the tethering device 301.

Once the certificates are validated, the HTTPS server 410 returns a HTML response page to the tethered device 302 at operation 444. The HTML response page indicates whether or not the authentication is successful so that the tethered device 302 can communicate over the network using tethering. At operation 446, the HTTPS server 410 returns a success or failure status notification to the authentication service 408. At operation 448, the authentication service 408 provides the status to the framework 404. At operation 450, if the authentication is successful, the tethering device 301 removes the firewall rules and the HTTP/HTTPS redirection rules so that the network traffic to or from the tethered device 302 can be communicated over the VPN or another network through the tethering device 301. Of course, if the certificates are not validated during the mutual authentication process 442, then the firewall rules are maintained and network traffic to or from the tethered device 302 is blocked. At operation 452, the authentication process is terminated.

Figure 5A:
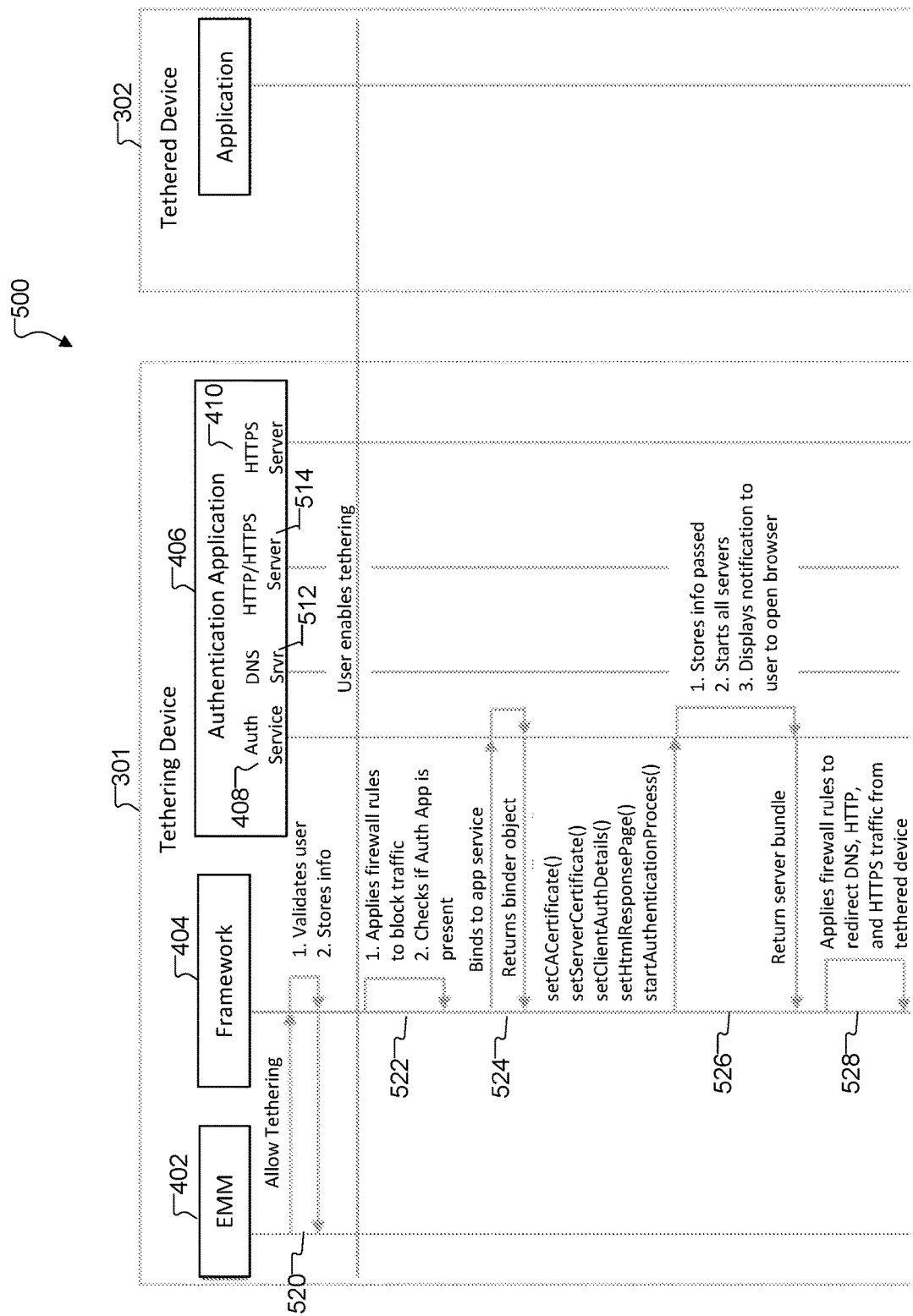
FIGS. 5A and 5B illustrate another example certificate based authentication process for tethering in accordance with this disclosure.
Figure 5B:
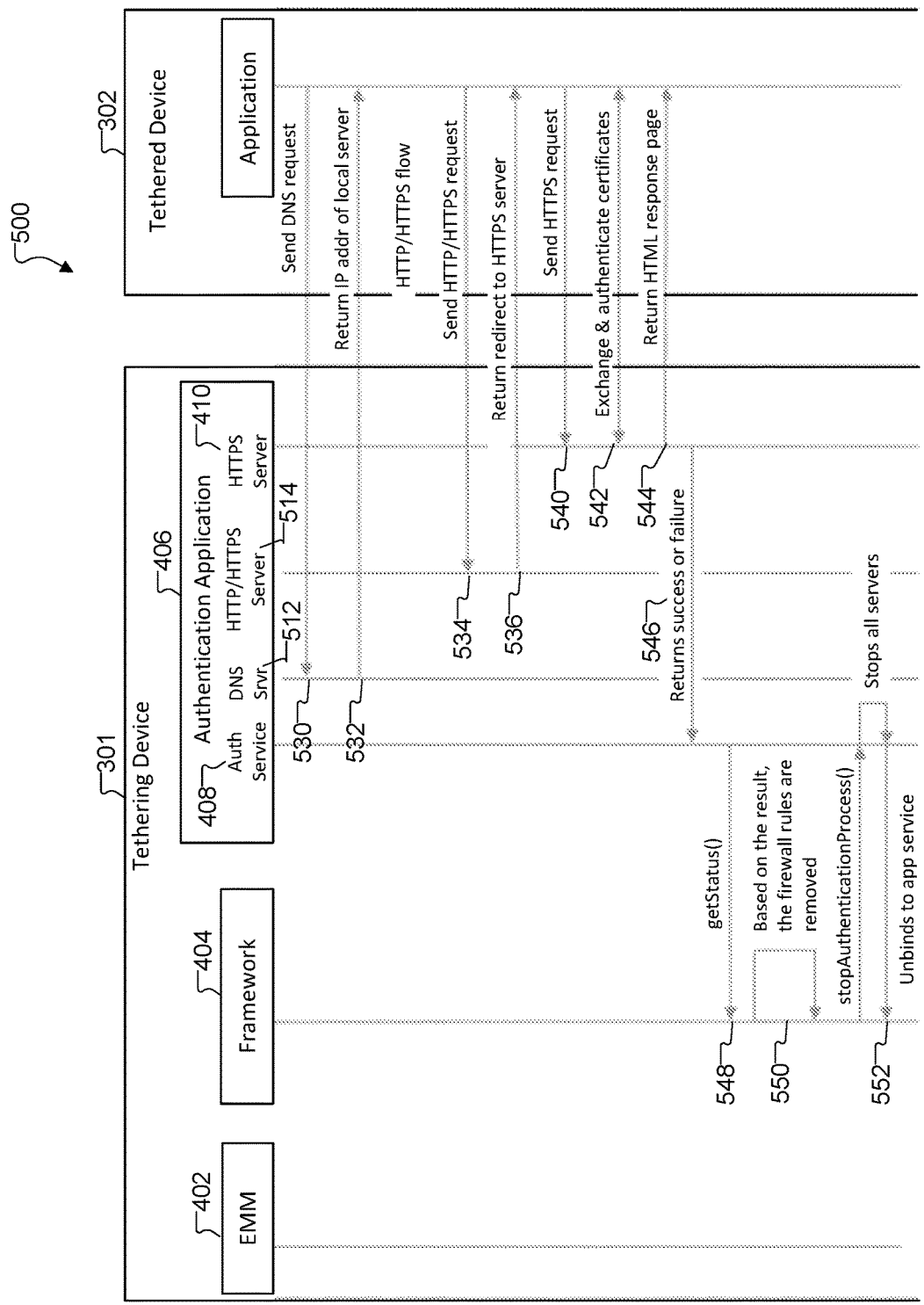

FIGS. 5A and 5B illustrate another example certificate based authentication process 500 for tethering in accordance with this disclosure. For ease of explanation, the process 500 is described as involving the tethering device 301 and the tethered device 302 of FIG. 3. In particular, the process 500 can include or represent the mutual authentication process 305 of FIG. 3. However, the process 500 could be used with any other suitable device or system and represent any suitable process without departing from the scope of this disclosure.

As shown in FIGS. 5A and 5B, the process 500 includes many components and operations that are the same as, or similar to, corresponding components and operations of the process 400. While the process 400 involves HTTPS requests from the tethering device 302, the process 500 can be used when the tethered device 302 generates DNS or HTTP requests as well.

The tethering device 301 includes multiple components, including the EMM module 402, the framework 404, and the authentication application 406. At the start of the process 500, the tethered device 302 is connected to the tethering device 301. Initially, the tethering device 301 may not know whether the tethered device 302 is an authorized device for VPN communication. Thus, the process 500 is performed to authenticate the tethered device 302.

As discussed previously, each device 301-302 is pre-configured with certificates for use in the process 500. For example, the tethering device 301 is configured with its user certificate along with the CA certificate for the tethered device 302. The tethered device 302 is configured with its user certificate along with the CA certificate of the tethering device 301. In some embodiments, the tethering device 301 has VPN capabilities enabled.

At operation 520, the EMM module 402 confirms the validity of tethering by validating the presence of the tethered device 302 and storing tethering information in a data storage (e.g., a database). In some embodiments, this is an optional step.

At operation 522, the tethering device 301 (and, in particular, the framework 404) detects that the tethering interface is active, and applies one or more firewall rules to block all network traffic from the tethered device 302. That is, the tethering device 301 applies the firewall rules to ensure that network traffic from the tethered device 302 is not sent over the VPN through the tethering device 301. In some embodiments executing a LINUX operation system, the firewall rules can be based on iptables. The framework 404 also determines if the authentication application 406 is present on the tethering device 301. If the authentication application 406 is present, then at operation 524, the framework 404 performs a bind process to launch the authentication application 406 in the background on the tethering device 301.

At operation 526, the framework 404 provides the pre-installed certificates at the tethering device 301 (e.g., the CA certificate of the tethering device 301 and the user certificate of the tethered device 302) to the authentication application 406, and the authentication application 406 stores the certificates. The authentication application 406 also initiates one or more local servers that will be used for the mutual authentication session between the tethering device 301 and the tethered device 302. As shown in FIGS. 5A and 5B, the local servers include the authentication service 408, the HTTPS server 410, a DNS server 512, and a HTTP/HTTPS server 514.

At operation 528, the tethering device 301 applies firewall rules to redirect all network traffic from the tethered device 302 to the tethering device 301. In particular, HTTPS traffic from the tethered device 302 is redirected to the HTTPS server 410, DNS traffic is redirected to the DNS server 512, and HTTP/HTTPS traffic is redirected to the HTTP/HTTPS server 514.

At operation 530, the tethered device 302 sends a DNS request (e.g., a request to access a web page or web server), which is routed to the DNS server 512. At operation 532, the DNS server 512 returns the IP address of the DNS server 512 rather than the IP address of the web page. At operation 534, the tethered device 302 sends a HTTP/HTTPS request, which is routed to the HTTP/HTTPS server 514. At operation 536, the HTTP/HTTPS server 514 returns a temporary redirection to the tethered device 302. This may include the HTTP/HTTPS server 514 sending an invalid certificate to the tethered device 302 indicating that traffic is to be sent to a different address. The invalid certificate includes temporary HTTPS redirection with the address of the HTTPS server 410 with client authentication. Since the invalid certificate to the tethered device 302 has a HTTPS redirection, at operation 540, the tethered device 302 sends a HTTPS request to the HTTPS server 410 for authentication on the tethering device 301.

At operation 542, the tethering device 301 and the tethered device 302 perform a mutual authentication process. As a part of the operation 542, the tethering and tethered device exchange certificates. That is, the tethering device 301 sends the user certificate of the tethering device 301 to the tethered device 302. The tethered device 302 authenticates the user certificate of the tethering device 301 using the CA certificate of the tethering device 301, which is already installed on the tethered device 302. Likewise, the tethered device 302 sends the user certificate of the tethered device 302 to the tethering device 301. The tethering device 301 authenticates the user certificate of the tethered device 302 using the CA certificate of the tethered device 302, which is already installed on the tethering device 301.

Once the certificates are validated, the HTTPS server 410 returns a HTML response page to the tethered device 302 at operation 544. The HTML response page indicates whether or not the authentication is successful so that the tethered device 302 can communicate over the network using tethering. At operation 546, the HTTPS server 410 returns a success or failure status notification to the authentication service 408. At operation 548, the authentication service 408 provides the status to the framework 404. At operation 550, if the authentication is successful, the tethering device 301 removes the firewall rules and the HTTP/HTTPS redirection rules so that the network traffic to or from the tethered device 302 can be communicated over the VPN or another network through the tethering device 301. Of course, if the certificates are not validated during the mutual authentication process 442, then the firewall rules are maintained and network traffic to or from the tethered device 302 is blocked. At operation 552, the authentication process is terminated.

Although FIGS. 4A, 4B, 5A, and 5B illustrate example details of certificate based authentication processes for tethering, various changes may be made to these figures. For example, various operations in FIGS. 4A, 4B, 5A, and 5B could overlap, occur in parallel, occur in a different order, or occur any number of times. Also, the specific operations shown in FIGS. 4A, 4B, 5A, and 5B are examples only, and other techniques could be used to perform each of the operations shown in these figures.

It should be noted that the various functions and operations shown and described above with respect to FIGS. 3 through 5B can be implemented in the devices 301-302 (which could include any of the electronic devices 101, 102, 104 or the server 106) in any suitable manner. For example, in some embodiments, at least some of the functions and operations can be implemented or supported using one or more software applications or other software instructions that are executed by the processor(s) 120, 240 of the electronic device(s). In other embodiments, at least some of the functions and operations can be implemented or supported using dedicated hardware components. In general, the functions and operations can be performed using any suitable hardware or any suitable combination of hardware and software/firmware instructions. Also, computing and communication systems come in a wide variety of configurations, and FIGS. 3 through 5B do not limit the scope of this disclosure to any particular configuration.

Figure 6:
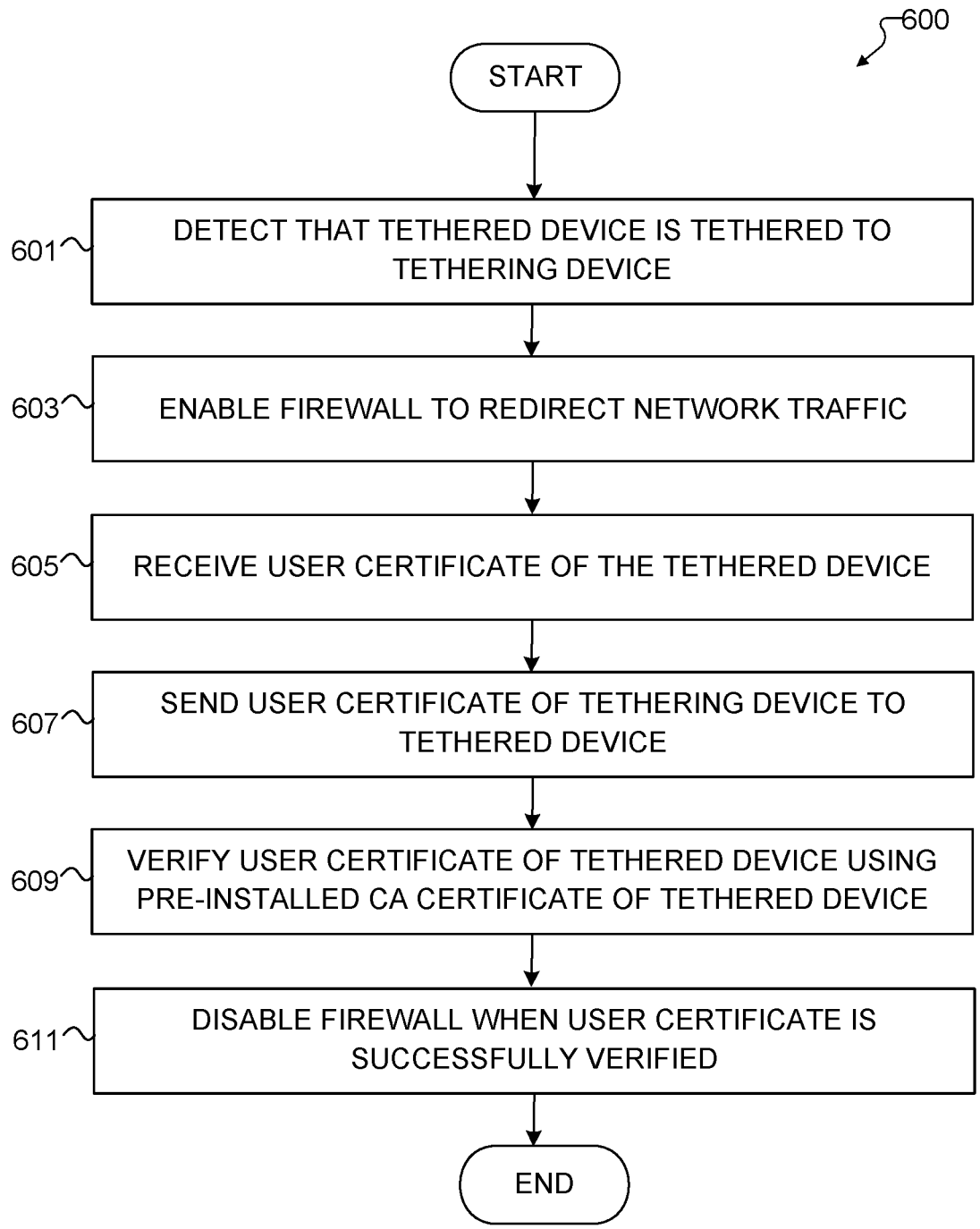
FIG. 6 illustrates an example method for certificate based authentication for tethering in accordance with this disclosure.

FIG. 6 illustrates an example method 600 for certificate based authentication for tethering in accordance with this disclosure. For ease of explanation, the method 600 shown in FIG. 6 is described as involving the process 400 shown in FIGS. 4A and 4B or the process 500 shown in FIGS. 5A and 5B. The method 600 may be performed by an electronic device, such as the tethering device 301 of FIG. 3. However, the method 600 could involve any other suitable process and be performed by any suitable device or system without departing from the scope of this disclosure.

At operation 601, a tethering device detects that a tethered device is tethered to the tethering device. This can include, for example, the tethering device 301 detecting that the tethered device 302 is tethered to the tethering device 301.

At operation 603, the tethering device enables a firewall to redirect network traffic from the tethered device to an authentication application executing on the tethering device. This can include, for example, the tethering device 301 enabling a firewall to redirect network traffic from the tethered device 302 to the authentication application 406.

At operation 605, the tethering device receives, from the tethered device, a user certificate of the tethered device during an authentication process. This can include, for example, the tethering device 301 receiving a user certificate of the tethered device 302 from the tethered device 302.

At operation 607, the tethering device sends a user certificate of the tethering device to the tethered device during the authentication process. The user certificate of the tethering device is configured to be verified by the tethered device using a CA certificate of the tethering device that is installed on the tethered device. This can include, for example, the tethering device 301 sending a user certificate of the tethering device 301 to the tethered device 302, which already has a CA certificate of the tethering device 301 installed thereon.

At operation 609, the tethering device verifies the user certificate of the tethered device using a CA certificate of the tethered device that is installed on the tethering device. This can include, for example, the tethering device 301 verifying the user certificate of the tethered device 302 using the CA certificate of the tethered device 302 installed thereon.

At operation 611, in response to successful verification of the user certificate of the tethered device, the tethering device disables the firewall to allow network traffic to and from the tethered device. This can include, for example, the tethering device 301 disabling the redirection firewall to allow network traffic to and from the tethered device 302. In some embodiments, this can include traffic transmitted over an enterprise VPN.

Although FIG. 6 illustrates one example of a method 600 for certificate based authentication for tethering in accordance with this disclosure, various changes can be made to FIG. 6. For example, various steps in FIG. 6 could overlap, occur in parallel, occur serially, occur in a different order, or occur any number of times. Also, the steps of the method 600 could be implemented in any suitable manner, such as entirely within the tethering device 301 or using a combination of devices. For instance, the tethering device 301 could collect data and provide the data to a server 106, which could then process the data and generate any suitable output.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method, comprising:
   enabling, by a tethering device that is tethered to a tethered device, a firewall to redirect network traffic from the tethered device to an authentication application executing on the tethering device;
   receiving, by the tethering device from the tethered device, a user certificate of the tethered device during an authentication process;
   verifying, by the tethering device, the user certificate of the tethered device using a certificate authority (CA) certificate of the tethered device that is installed on the tethering device;
   sending, by the tethering device, a user certificate of the tethering device to the tethered device during the authentication process, wherein the user certificate of the tethering device is configured to be verified by the tethered device using a CA certificate of the tethering device that is installed on the tethered device; and
   in response to successful verification of the user certificate of the tethered device, disabling the firewall to allow the network traffic to and from the tethered device.

2. The method of Claim 1, wherein the user certificates and the CA certificates are installed on the tethering device and the tethered device as part of an enterprise device configuration.

3. The method of claim 1, further comprising:
   before receiving the user certificate of the tethered device, sending an invalid certificate to the tethered device and receiving a hypertext transportation protocol secure (HTTPS) request from the tethered device, wherein the authentication application hosts a HTTPS server configured to receive the HTTPS request.

4. The method of claim 3, further comprising:
receiving, by the tethering device, a domain name system (DNS) request from the tethered device; and
sending, by the tethering device in response to the DNS request, an internet protocol (IP) address of a DNS server to the tethered device.

5. The method of claim 1, further comprising:
before enabling the firewall, detecting, by the tethering device, that the tethered device is tethered to the tethering device.

6. The method of claim 1, wherein the network traffic to and from the tethered device is transmitted through an enterprise virtual private network (VPN).

7. The method of claim 1, wherein:
the tethering device is a mobile device; and
the tethered device is a laptop, a tablet, a mobile device, a workstation, or an Internet of Things (IoT) device.

8. An electronic device comprising:
at least one memory configured to store instructions; and
at least one processor configured when executing the instructions to:
enable a firewall to redirect network traffic from a tethered device to an authentication application executing on the electronic device, wherein the tethered device is tethered to the electronic device;
receive a user certificate of the tethered device from the tethered device during an authentication process;
verify the user certificate of the tethered device using a certificate authority (CA) certificate of the tethered device that is installed on the electronic device;
send a user certificate of the electronic device to the tethered device during the authentication process, wherein the user certificate of the electronic device is configured to be verified by the tethered device using a CA certificate of the electronic device that is installed on the tethered device; and
in response to successful verification of the user certificate of the tethered device, disable the firewall to allow the network traffic to and from the tethered device.

9. The electronic device of claim 8, wherein the user certificates and the CA certificates are installed on the electronic device and the tethered device as part of an enterprise device configuration.

10. The electronic device of claim 8, wherein the at least one processor is further configured to:
before receiving the user certificate of the tethered device, send an invalid certificate to the tethered device and receive a hypertext transportation protocol secure (HTTPS) request from the tethered device, wherein the authentication application hosts a HTTPS server configured to receive the HTTPS request.

11. The electronic device of claim 10, wherein the at least one processor is further configured to:
receive a domain name system (DNS) request from the tethered device; and
send, in response to the DNS request, an internet protocol (IP) address of a DNS server to the tethered device.

12. The electronic device of claim 8, wherein the at least one processor is further configured to:
before enabling the firewall, detect that the tethered device is tethered to the electronic device.

13. The electronic device of claim 8, wherein the network traffic to and from the tethered device is transmitted through an enterprise virtual private network (VPN).

14. The electronic device of claim 8, wherein:
the electronic device is a mobile device; and
the tethered device is a laptop, a tablet, a mobile device, a workstation, or an Internet of Things (IoT) device.

15. A non-transitory computer readable medium containing computer readable program code that, when executed, causes at least one processor of an electronic device to:
enable a firewall to redirect network traffic from a tethered device to an authentication application executing on the electronic device, wherein the tethered device is tethered to the electronic device;
receive a user certificate of the tethered device from the tethered device during an authentication process;
verify the user certificate of the tethered device using a certificate authority (CA) certificate of the tethered device that is installed on the electronic device;
send a user certificate of the electronic device to the tethered device during the authentication process, wherein the user certificate of the electronic device is configured to be verified by the tethered device using a CA certificate of the electronic device that is installed on the tethered device; and
in response to successful verification of the user certificate of the tethered device, disable the firewall to allow the network traffic to and from the tethered device.

16. The non-transitory computer readable medium of claim 15, wherein the user certificates and the CA certificates are installed on the electronic device and the tethered device as part of an enterprise device configuration.

17. The non-transitory computer readable medium of claim 15, wherein the computer readable program code when executed further causes the at least one processor to:
before receiving the user certificate of the tethered device, send an invalid certificate to the tethered device and receive a hypertext transportation protocol secure (HTTPS) request from the tethered device, wherein the authentication application hosts a HTTPS server configured to receive the HTTPS request.

18. The non-transitory computer readable medium of claim 17, wherein the computer readable program code when executed further causes the at least one processor to:
receive a domain name system (DNS) request from the tethered device; and
send, in response to the DNS request, an internet protocol (IP) address of a DNS server to the tethered device.

19. The non-transitory computer readable medium of claim 15, wherein the computer readable program code when executed further causes the at least one processor to:
before enabling the firewall, detect that the tethered device is tethered to the electronic device.

20. The non-transitory computer readable medium of claim 15, wherein the network traffic to and from the tethered device is transmitted through an enterprise virtual private network (VPN).

* * * * *